June 4, 1968  J. L. McCURDY ET AL  3,386,495
APPARATUS AND METHOD FOR ALLOWING AND INTERRUPTING
THE FLOW OF THERMOPLASTIC MATERIALS
Filed May 27, 1966
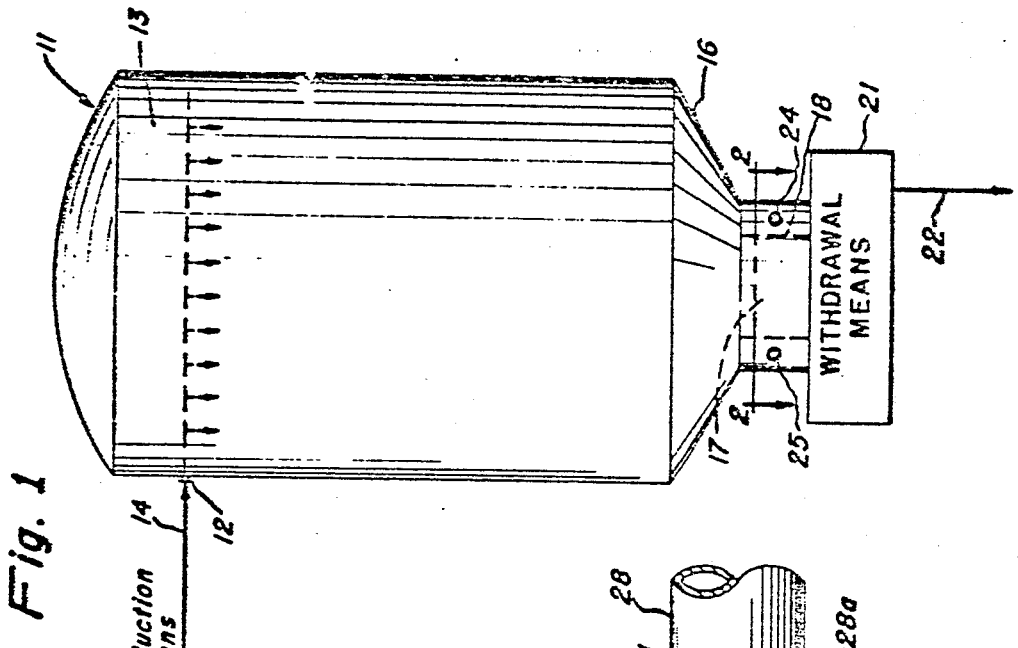
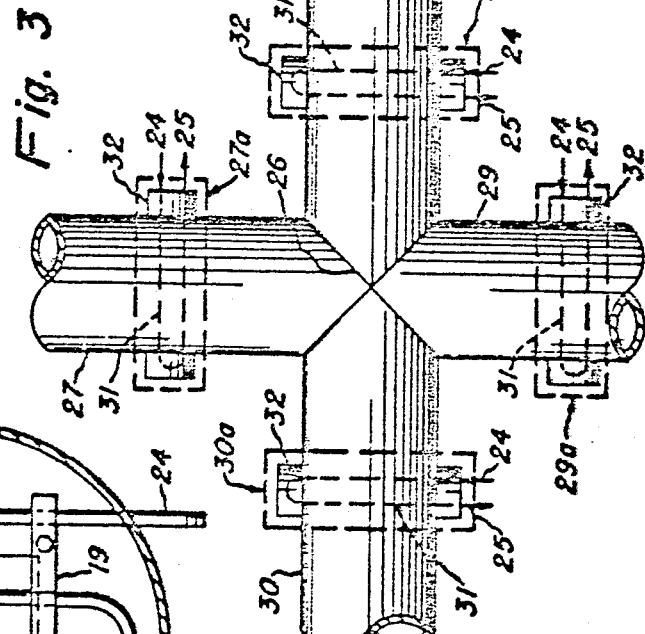
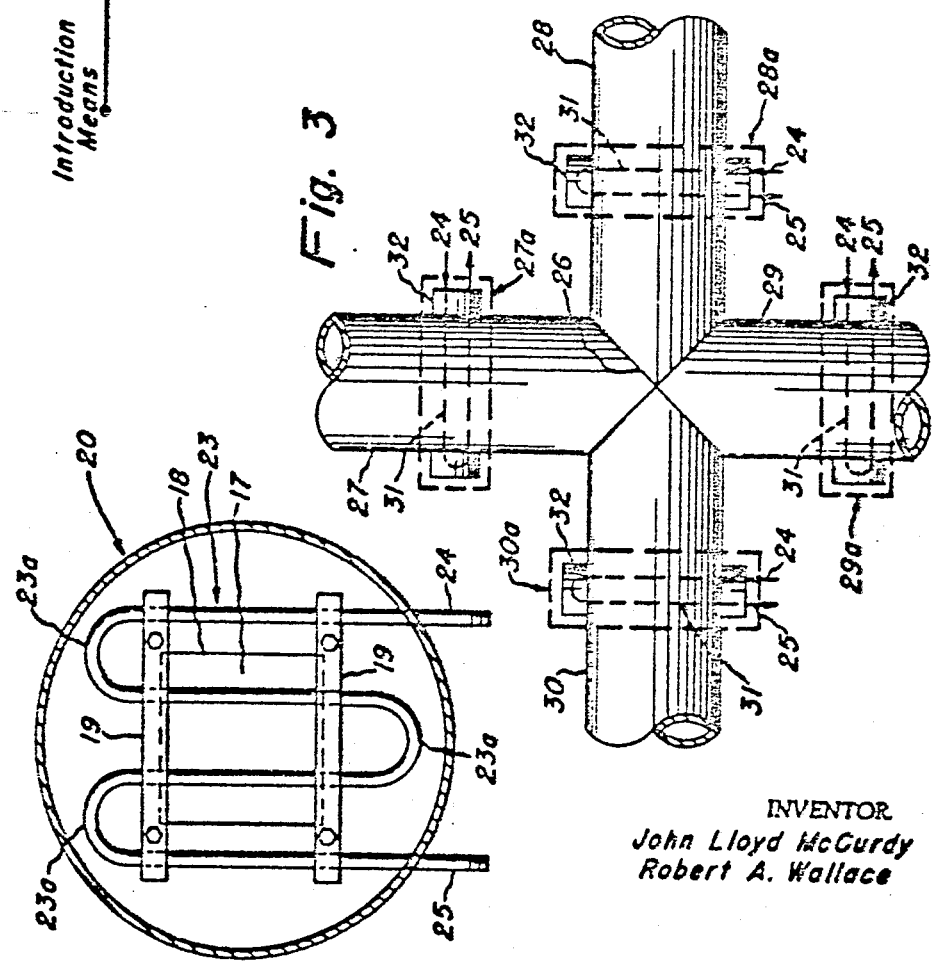
INVENTOR
John Lloyd McCurdy
Robert A. Wallace

United States Patent Office 3,386,495
Patented June 4, 1968

3,386,495
APPARATUS AND METHOD FOR ALLOWING AND INTERRUPTING THE FLOW OF THERMOPLASTIC MATERIALS
John Lloyd McCurdy, Glen Ellyn, Ill., and Robert A. Wallace, Torrance, Calif., assignors to Standard Oil Company, Chicago, Ill., a corporation of Indiana
Filed May 27, 1966, Ser. No. 553,470
20 Claims. (Cl. 165—2)

ABSTRACT OF THE DISCLOSURE

A shaped means spanning an opening, the shaped means being a conduit having reverse loops for transporting a heat exchange medium back and forth across the opening, the opening having a periphery defining it for passing heat sensitive materials therethrough, and retaining means for holding the shaped conduit means so that the heat exchange medium may be circulated to regulate the flow of the heat sensitive materials passing through the opening. This novel apparatus for allowing, interrupting, and regulating the flow of heat sensitive materials can be utilized wherever an opening defined by a peripheral means for moving materials therethrough exists, such as pipelines, manifolds, storage tanks, etc.

---

This invention relates to novel method and apparatus for retaining and allowing the movement of thermoplastic materials. The invention particularly relates to vessels and lines, such as thermoplastic holding tanks and pipelines which have as an inherent part or as an additional part therein an apparatus which uniquely provides for the flow and cessation of flow of thermoplastics. The new method and apparatus to be described herein is applicable to other adaptations, such as in pipeline manifolds or many types of vessels to interrupt, regulate and permit the flow of materials which have viscosity characteristics that are responsive to heat.

Many types of devices and methods are shown in the art for providing opening and closing means to hold materials in tanks, lines, and other types of vessels. These holding devices cover a broad range of pneumatically, hydraulically, and mechanically actuated valves; however, it is believed that none of the prior art discloses the novel subject matter described and claimed herein. In the various segments of the prior art concerning the handling of materials which have characteristics wherein viscosity is responsive to heat, the existing material holding devices, vessels and lines have limited effectiveness and disadvantages due to the absence of simple means for allowing and interrupting the flow of the highly viscous thermoplastic materials. This is particularly true where valves and other types of closures have moving parts which come directly into contact with the plastic material. Often, the substances handled are of such a highly viscous nature in their flowable state that substantially large openings are required. Furthermore, when mechanical and other types of valves are used to close large openings, the metallic mass of the valve retains heat which destroys the desirable uniform rate of heat transfer within the material next to the valve and adversely affects that material. Also, the materials are frequently of such a nature, and the processing requirements such that it is imperative to move the substances as quickly as possible or to positively retain them in a manner unavailable prior to this invention. Furthermore, holding vessels can be constructed in accordance with this invention so that should vessel withdrawal apparatuses, such as pumps, and auger-type conveyors, break down or malfunction, the movement of material can be interrupted immediately upstream from the equipment problem and the apparatus repair can be carried out without removing the entire contents of the vessel.

This invention also provides a novel method and apparatus for commencing and interrupting the flow of materials in pipelines and pipeline systems wherein one or more of these novel devices can be installed within a pipeline near a juncture or in a manifold system to start and stop the flow of plastic materials and to direct the flow of said materials along the desired paths.

It is a primary object of this invention to provide a vessel having a novel rigid means and method for allowing and interrupting the flow of thermoplastic materials wherein no moving parts are involved.

It is a further object of this invention to provide apparatus and method for stopping and starting the flow of thermoplastic materials from a vessel wherein the cessation of flow is such that the withdrawal means may be removed from the lower suction ports of the vessel in order to facilitate the rapid repair of equipment without removing the contents of said vessel.

Another object of this invention is to provide novel means and method for commencing and stopping the flow of thermoplastic materials in pipelines.

A further object of this invention is to provide novel means and method for changing the path of flow of thermoplastic materials at pipeline junctures and in pipeline manifolds.

It has been discovered that a heat exchange apparatus such as a shaped means for passing a heat exchange medium therethrough may be placed or disposed within the opening of a vessel through which the thermoplastic contents of said vessel must pass so that as the material passes over and between the surfaces of said heat exchange apparatus heat may be withdrawn from said materials to stop said flow or the temperature may remain constant or heat can be applied to said materials to cause flow, or to continue the flow of said thermoplastic materials. The shaped means for transporting a heat exchange medium may be inserted in a pipeline in a direction transverse to the flow of materials within said line so that thermoplastic materials may flow over and between said surfaces without substantially reducing the open cross sectional area of said line and without creating significant obstructions to flow. Heat can be removed from the material flowing over the smooth surfaces of the heat exchange apparatus by introducing a cold heat exchange medium into the conduit-like heat exchange apparatus to remove heat from said flowing material to cause said material to become substantially solid to interrupt the flow of the material without the aid of moving parts. Conversely, when a heated heat exchange medium is introduced into the apparatus, the substantially solid thermoplastic material upon taking up heat becomes less viscous and flow commences.

The accompanying drawings illustrate the preferred embodiments of this invention; however, it is understood that the specific details of the system may vary widely without departing from the basic principles of the invention wherein:

FIG. 1 is an elevation view of a holding tank;
FIG. 2 is a sectional view of the plastic valve taken at lines 2—2 in FIG. 1; and
FIG. 3 portrays the plastic valve adapted for use in a series of pipelines.

Referring to FIG. 1, tank 11 may be any type of vessel for holding thermoplastic materials which for the purpose of illustration has an opening 12 at the top 13 equipped with material introduction means 14 to which material is supplied from line 15. Vessel 11 is equipped at its lower portion 16 with an opening 17 for the removal of the contained thermoplastic materials. Lower portion 16 of vessel 11 is equipped with a periphery 18 defining opening 17, said periphery having joined thereon a retaining means 19 for holding the novel plastic valve assembly 20. Immediately below valve assembly 20 and joined to the lower extremity of tank 11 is withdrawal means 21 which may be a gear type or auger type pump for facilitating the removal of the contents of vessel 11 through line 22.

FIG. 2 taken at lines 2—2 in FIG. 1 is a view of the plastic valve assembly 20 wherein retainer 19 is shown holding the heat exchange apparatus 23 having inlet 24 and outlet 25 for the circulation of a heat exchange medium in a path through said exchange means defined by the configuration of said means as it passes across the opening defined by vessel periphery 18.

FIG. 3 is a plan view of a pipeline junction 26 wherein lines 27, 28, 29, and 30 each being equipped with the novel plastic valve 31. Heat exchange apparatus 23 in plastic valve 31 crosses the interior of each pipe in a direction transverse to the flow of thermoplastic material and the reversing loops 23a in the heat exchange apparatus are located on the exterior of each pipe within the insulated periphery 32 of the plastic valve 31. Each plastic valve 31 in lines 27, 28, 29, and 30 is equipped with inlet and outlet means 24 and 25, respectively, shown in FIG. 2 for the introduction and removal of a heat exchange medium.

In operation the plastic valve assembly 20 shown in FIG. 2 is placed within a section or opening in a vessel or line in a direction transverse to the flow of material. The plastic valve assembly may be a separate unit mounted on a flange or periphery for insertion into a vessel or a pipeline at any desired point, or the plastic valve assembly may be built into the vessel or line and held in place by welding or as an inherent part of the vessel or the line. The shape of the heat exchange apparatus 23 may have any configuration, preferably one that minimizes obstructions across the cross sectional area of a line or in the opening of a vessel from which the contents are withdrawn or introduced. To minimize the space occupied by the heat exchange apparatus 23 reverse loops 32a can extend through the periphery 18 or the reversed loops can be built into said periphery so that said loops are located outside the opening through which the materials pass. Certainly, for specific purposes or for particular adaptations the reverse loops 23a in the heat exchange apparatus, which is a part of the plastic valve assembly 20, can also be located entirely within the openings.

Since the material moving across the smooth surfaces of the heat exchange apparatus 23 has heat sensitive viscosity characteristics, when a heated medium is introduced into the heat exchange apparatus at inlet 24 and follows a particular path through said apparatus and said reverse loops 23a defined by any desired special configuration of the valve assembly 20, heat is transferred to the material, thereby reducing the viscosity or resistance to flow of said material and consequently promoting the flow of the materials as the heated medium is circulated through the conduit-like heat exchange apparatus to the outlet 25. Conversely, when the heat exchange medium introduced into apparatus 23 at inlet 24 for circulation through said apparatus and subsequent removal at outlet 25 is cool in comparison to the thermoplastic material moving over the smooth exterior surfaces of the apparatus, the material becomes more viscous and substantially solid to form a plug-like mass which has the configuration of the interior of the vessel or line, and the flow of said material is interrupted.

In FIG. 1, as thermoplastic materials previously introduced into vessel 11 through opening 12 at top 13 by introduction means 14 is withdrawn from said vessel over the smooth surfaces of heat exchange apparatus 23 at the lower vessel portion 16 through the periphery 18 defining opening 17 by withdrawal means 21. A heated circulatory heat exchange medium is moved through the heat exchange apparatus disposed across opening 17 to facilitate the flow of said thermoplastic materials. However, should it be desired that flow of thermoplastic materials from vessel 11 over the smooth surfaces of heat exchange means 23 in opening 17 be interrupted, the passage of a cool circulatory heat exchange medium through heat exchange means 23 of assembly 20, shown in FIG. 2, is provided so that heat is transferred from the exuding thermoplastic materials to cause said materials to become a plug-like non-flowable substantially solid mass about the conduit-like heat exchange apparatus. In the FIG. 1 embodiment this method is particularly advantageous when the breakdown of withdrawal equipment 21, such as gear or auger type pumps located immediately outside the lower portion 16 of vessel 11, become inoperative and require immediate repair, because the flow of material from vessel 11 can be simply and uniquely interrupted at the opening immediately above said equipment.

This method and apparatus provides a way of circumventing the necessity of removing the remaining contents of the vessel and the instant invention also provides rapid access to the malfunctioning equipment. Prior to the conception of this novel means and method for interrupting and commencing the flow of thermoplastic materials, when withdrawal apparatus became inoperative it was necessary to drain the thermoplastic materials from the vessel before repairs could be made. The drained material was discarded at substantial expense in time, labor, and product loss. An alternative was to cool the entire tank of thermoplastic materials which required about three to four days prior to apparatus repair, followed by the reheating of the system which required an additional four-day period. This plastic valve assembly being entirely free of moving parts limits mechanical and other types of wear and consequent maintenance since only the introduction and removal of a circulatory heat exchange medium, which is generally readily available in thermoplastic producing installations, provides the commencement and interruption of flow.

The circulatory heat exchange medium can be hot oil which is circulated from the central reactor system. For polystyrene or polyethylenes, the hot oil circulated through the heat exchange apparatus can have a temperature within the range of 400–500° F., preferably 425–475° F., to permit the flow of the thermoplastic materials. For polyvinyl chlorides the hot oil temperatures can be within the range of 200–300° F., preferably 235–270° F., to permit the flow of said PVC thermoplastic materials. To interrupt the flow of the thermoplastic materials the same oil heat exchange medium can be circulated through the conduit-like heat exchange apparatus and this oil can have a temperature within the range of about 40–100° F., or more, depending upon outside temperature conditions since the oil will probably be at atmospheric temperature. Water can be used as a circulatory heat exchange medium; however, at higher temperatures a high pressure system is required and significant water treatment is necessary to prevent precipitation of solids from the water throughout the heat exchange equipment installation.

In the operation of the embodiment shown in FIG. 2, thermoplastic materials introduced into line 27 may be stopped at the plastic valve 31 located at position 27a when a cool exchange medium is introduced through the shaped conduit means of the heat exchange apparatus 23 to withdraw heat from the flowing material. Commencement of flow of said material beyond position 27a is provided by the introduction and circulation of a heated circulatory medium within heat exchange apparatus 23. Subsequently, the flowing material may be routed in any and all directions through lines 28, 29, and 30 by the introduction of a heated or cooled circulatory medium through the heat exchange means 23 located in plastic valve 31 at valve positions 27a, 28a, 29a, and 30a.

Furthermore, all plastic valves may be "turned on" or "turned off" by the introduction of a heated or cooled medium in accordance with the teachings of this specification simultaneously or alternately, depending upon the requirements in any specific situation. Similarly, a system of plastic valves may be used in a complex manifold in the directing and transporting of heat sensitive thermoplastic materials.

Additional advantages provided by this novel apparatus and method for commencing, interrupting, and directing the flow of thermoplastic materials reside in the ability to accurately control the heat transfer in the system, that is, the amount of heat introduced into the thermoplastic medium or withdrawn therefrom may be controlled quite accurately by the temperature of the circulatory heat exchange medium passing through heat exchange means 23. In contrast where a large massive valve type mechanical closure means is used to interrupt the flow of materials, these massive plugs, gates, etc., which are generally constructed of metal, create leakage problems and the asbestos or graphite impregnated asbestos valve packing can contaminate the thermoplastic materials. Additionally, the massive metal plugs or gates retain heat which deleteriously effect the thermoplastic material in a zone around these obstructions since the heat transfer cannot be adequately controlled. Furthermore, the above problems and many others are avoided in the operation of the disclosed apparatus and the application of the described methods in a system free of moving parts as discussed herein.

While in the foregoing specification this invention has been described in relation to preferred embodiments thereof, and many details have been set forth for the purpose of illustration, it will be apparent to those skilled in the art that the invention is susceptible to other embodiments and that many of the details set forth herein can be varied considerably without departing from the basic principles of the invention.

Having thus described the invention, what is claimed is:

1. Apparatus for allowing and interrupting the flow of thermoplastic material including in combination:
   (a) a shaped means for transporting a heat exchange medium across an opening through which thermoplastic materials flow;
   (b) peripheral means defining said opening; and
   (c) retaining means located adjacent said peripheral means for holding said shaped means.

2. The structure of claim 1 wherein said shaped means is a conduit having reverse loops and passing across said opening at spaced intervals.

3. The structure of claim 2 wherein said conduit means has an inlet and an outlet for continuously circulating said heat exchange medium.

4. A vessel for holding thermoplastic material including in combination:
   (a) a peripheral means defining an opening for withdrawing the thermoplastic material contained therein;
   (b) a shaped means for transporting a heat exchange medium at intervals across said opening through which thermoplastic materials flow; and
   (c) retaining means located adjacent said peripheral means for holding said shaped means.

5. The structure of claim 4 wherein said shaped means is a conduit having reverse loops and extending at intervals across said opening.

6. The structure of claim 5 wherein said conduit has inlet and outlet means for continuously circulating said heat exchange medium.

7. A pipeline system for transporting a thermoplastic material and for allowing, interrupting and directing the flow of said material, said system having in combination:
   (a) a junction wherein at least two lines cross;
   (b) each line equipped with a shaped means for transporting a heat exchange medium at intervals across the interior of said line, said shaped means located a distance from said junction; and
   (c) retaining means located adjacent said peripheral means for holding said shaped means.

8. The structure of claim 7 wherein said junction is located in a pipeline manifold;

9. The structure of claim 7 wherein said shaped means is a conduit having reverse loops and extending across the interior of said line at intervals.

10. The structure of claim 9 wherein said shaped means include an inlet and an outlet for circulating a heat exchange medium.

11. The structure of claim 7 wherein said retaining means is an insulated exterior ring.

12. In a process for allowing and interrupting the flow of thermoplastic materials in a vessel, the steps of flowing thermoplastic materials through an opening and across the smooth surfaces of a heat exchange apparatus, passing a cool heat exchange medium through the exchange apparatus over which thermoplastic materials flow to remove heat from said materials to cause said materials to become substantially solid to interrupt said flow; and circulating a heated medium through said heat exchange apparatus over which thermoplastic materials flow to heat said materials to decrease viscosity of said materials to cause flow.

13. The process of claim 12 wherein the allowance and interruption of flow of thermoplastic materials is in a pipeline system.

14. The process of claim 13 wherein the allowance and interruption of the flow of thermoplastic materials is in a thermoplastic holding tank.

15. The process of claim 12 wherein the cool heat exchange medium has a temperature within the range of 40–100° F. or more.

16. The process of claim 12 wherein the heated medium has a temperature within the range of 400–500° F., preferably 425–475° F.

17. The process of claim 12 wherein the heated medium has a temperature within the range of 200–300° F., preferably 235–270° F.

18. The process of claim 12 wherein the thermoplastic materials are polystyrenes.

19. The process of claim 12 wherein the thermoplastic materials are polyvinyl chlorides.

20. The process of claim 12 wherein the thermoplastic materials are polyethylenes.

References Cited
UNITED STATES PATENTS

| | | | |
|---|---|---|---|
| 2,212,222 | 8/1940 | Austin | 106—48 |
| 2,483,082 | 9/1949 | Young et al. | 62—293 |
| 2,572,555 | 10/1951 | Young et al. | 62—293 |

ROBERT A. O'LEARY, *Primary Examiner.*
CHARLES SUKALO, *Examiner.*